March 24, 1964     E. M. WEINBERG     3,126,129
RECORDING AND DISPENSING DEVICE
Filed Jan. 8, 1962
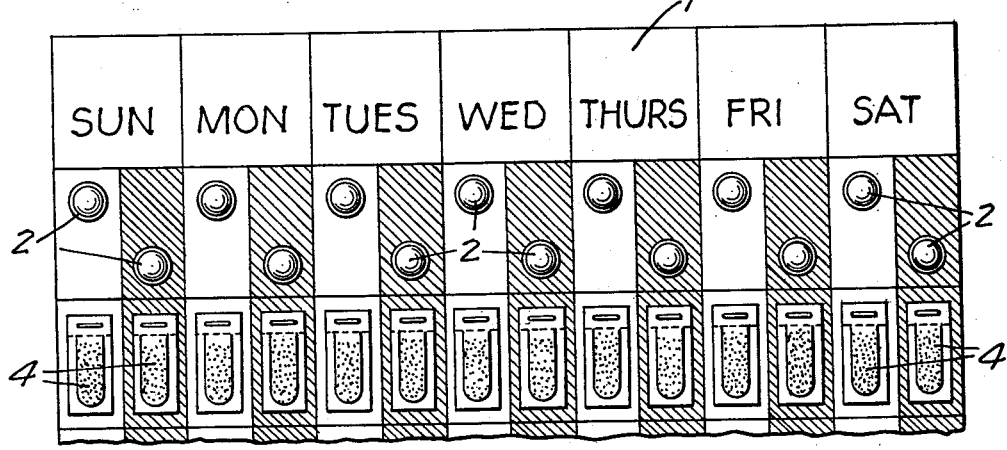
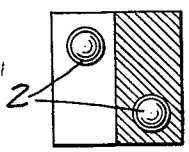 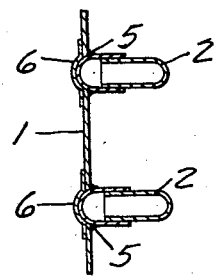 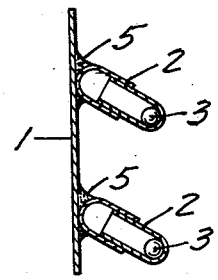
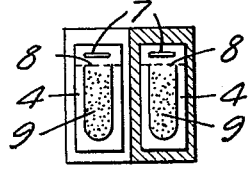
INVENTOR
EDWARD M. WEINBERG
BY
James A. Smith
ATTORNEY

United States Patent Office 3,126,129
Patented Mar. 24, 1964

3,126,129
RECORDING AND DISPENSING DEVICE
Edward M. Weinberg, Minneapolis, Minn.
(900 Bush Ave., St. Paul 6, Minn.)
Filed Jan. 8, 1962, Ser. No. 164,726
10 Claims. (Cl. 222—94)

This invention relates to a time recording and dispensing device for providing measured quantities of dentifrice, medicine, vitamins and the like at predetermined intervals and for providing a visual record thereof.

Various devices have been proposed to encourage children to develop regular habits of dental care. However, it is equally important to encourage not only regularity but also the proper and efficient use of dentifrice. Children often tend to place widely varying amounts of dentifrice on the toothbrush frequently resulting in waste of or the use of insufficient quantities of toothpaste or tooth powder. Moreover, a visual record is desirable to permit both parents and children to check on the regularity of the performance of such dental care and hygienic duties. Adults who regularly need to take medicinal tablets, vitamins, etc. also meet with similar problems.

It is therefore an object of this invention to provide a device for conveniently storing and regularly dispensing measured quantities of medicinals, dentifrice and other hygienic formulations and for providing a visual record thereof.

Another object is to provide a dispenser and time recorder of hygienic formulations which can be conveniently placed or mounted on the wall of the bathroom and which can be reused if desired.

Other objects and advantages will be apparent from the following description and the accompanying illustrations.

FIGURE 1 is a front view of a card device within the scope of this invention.

FIGURE 2 is a front view of a single day on the card of FIGURE 1 showing ampoules or capsules mounted thereon.

FIGURE 3 is a side view of the card device of FIGURE 2.

FIGURE 4 is a side view of the card device of FIGURE 2 in which the ampoules or capsules are mounted so as to extend outwardly and in a downward direction from the card.

FIGURE 5 is a front view of a single day on the card device of FIGURE 1 showing paper, foil or plastic packets affixed to the card by means of staples.

Referring to the illustrations, the invention is generally shown in FIGURE 1 and consists of a backing 1 divided vertically into the seven days of the week and further divided horizontally into one or more weeks, thereby providing a distinct area for each day. Affixed to each day is at least one detachable and openable container, which may be a capsule or ampoule as designated by 2 in FIGURES 1 to 4 or which may be a packet as designated by 4 in FIGURES 1 and 5. As shown in the device of FIGURE 1 the area corresponding to each day may be further divided into two portions, each of a different color, and one capsule or packet may be affixed to each of the two areas thereby providing two containers per day and a clear visual record of their use. The first week on the card device of FIGURE 1 shows, for purposes of illustration, capsules, whereas the second week shows packets.

When readily openable capsules or ampoules 2 are used, they may be mounted to a paper card or backing sheet by means of a suitable cement or adhesive 5 (FIGURE 3) or by inserting the capsule 2 snugly into a hole in the card which may be covered on the back side of the card with a pressure sensitive adhesive tape 6 (FIGURE 3). The capsules may be of the two-part variety, one part sliding concentrically about the other. In such cases, the cap or outer sleeve portion of the two-part capsule may be affixed securely to or integrally formed with the card or backing and the inner portion may then be readily removed to gain access to the contents thereof. This embodiment is particularly useful when the contents is a paste or powder, e.g., a dentifrice. When the contents are readily flowable, e.g., a liquid, or when a vitamin or medicinal tablet is contained therein, the capsule may be mounted to extend downwardly and outwardly from the front of the card, as shown in FIGURE 4. This permits removal of the inner sleeve portion of the capsule with less danger of spilling the contents. Such a tablet 3 is shown in the inclined two-part capsule of FIGURE 4. One piece capsules or ampoules which may be readily ruptured to gain access to the contents, may also be used and are preferably affixed in a semi-permanent but secure fashion to the card to permit removal therefrom when desired. In orded to provide an improved record of their use in the desired time sequence, the ampoules may be mounted in a staggered fashion, as shown in the first week of the card device of FIGURE 1.

When readily openable packets 4 are used, they may be mounted on the card or backing by means of a staple 7, as shown in FIGURE 5, or by a suitable adhesive or pressure sensitive tape. These packets may be simultaneously detached from the card and opened by tearing along a perforated portion 8 to gain access to the contents 9.

Although the time sequence card devices may also be used as a calendar to indicate the month, day and year, or even hour, they are preferably designed only to indicate a week-by-week sequence, in which form they may be reused, if desired, by reattaching filled ampoules or packets thereon.

The size of the readily detachable and openable containers must be sufficient to contain a single dose or dispensation of the desired contents, whether solid, paste or liquid. When the containers are filled with a measured amount of a paste, e.g., toothpaste, they are preferably fabricated of a flexible material, such as polyethylene plastic, aluminum foil, etc. to permit squeezing out of the pasty contents. This is especially desirable for ease of dispensing the proper quantity of toothpaste directly from the opened container onto the toothbrush without waste or spillage.

In use, the regular detachment of capsules or packets provides a visual indication, record or reminder and also insures the use of an appropriate predetermined quantity of material as well as a minimum of waste resulting from the use of excessive quantities of material and from spillage onto the wash bowl or floor. Moreover, the containers can retain their contents in sterile form until use. These card devices are also simple and pleasant to use for children, economical and practical for adults and parents, and an incentive to proper, regular and efficient hygienic and medicinal care.

Although the embodiment shown and revealed herein disclose the construction and operation of the invention, other embodiments, modifications and improvements will be apparent within the scope and spirit of this invention without departing therefrom.

I claim:

1. A recording and dispensing device for providing predetermined quantities of a dentrifrice and for providing a visual record and reminder of the periodic and regular use thereof which comprises a backing, one side of which is divided into areas corresponding to a plurality of weeks, each week being further divided into sections corresponding to the individual days thereof, and openable containers detachably affixed to said backing in a time sequence, at least one container being affixed to each of said daily sections, each of said containers having a measured quantity of dentrifrice therein corresponding to the requirements of a single tooth brushing operation.

2. The recording and dispensing device of claim 1 in which said openable containers are capsules.

3. The recording and dispensing device of claim 1 in which said openable containers are flexible, squeezable capsules.

4. The recording and dispensing device of claim 1 in which said openable containers are two-part capsules having an inner sleeve section and an outer sleeve section, said outer sleeve section being affixed to said backing and said inner sleeve section being detachable therefrom.

5. The recording and dispensing device of claim 1 in which said openable containers are two-part capsules having an inner sleeve section and an outer sleeve section, said outer sleeve section being affixed to said backing and said inner sleeve section being detachable therefrom, said ampoule extending outwardly and downwardly from said backing.

6. The recording and dispensing device of claim 1 in which said openable containers are packets.

7. The recording and dispensing device of claim 1 in which said openable containers are aluminum foil packets.

8. The recording and dispensing device of claim 1 in which said openable containers are plastic packets.

9. A recording and dispensing device for providing predetermined quantities of a dentrifrice and for providing a visual record and remainder of the periodic and regular use thereof which comprises a card, one side of which is divided into areas corresponding to a plurality of weeks, each week being divided into sections corresponding to the individual days thereof, each section corresponding to an individual day being further divided into at least two visually distinct portions, and an openable container detachably affixed to each of said visually distinct portions, each of said openable containers having a measured quantity of dentrifrice therein corresponding to the requirements of a single tooth brushing operation and being sufficiently flexible to permit removal of said dentrifrice by squeezing.

10. The recording and dispensing device of claim 9 in which said openable containers are affixed to said card in a regularly staggered manner to provide a further visual indication of their regular use.

References Cited in the file of this patent

UNITED STATES PATENTS

| | | |
|---|---|---|
| 1,419,658 | Bach | June 13, 1922 |
| 1,717,060 | Mottayaw | June 11, 1929 |
| 1,881,293 | Poirer et al. | Oct. 4, 1932 |
| 2,953,242 | Shaw | Sept. 20, 1960 |
| 3,029,939 | Feldman | Apr. 17, 1962 |